United States Patent
Oren et al.

(10) Patent No.: US 9,998,879 B2
(45) Date of Patent: Jun. 12, 2018

(54) APPARATUS, SYSTEM AND METHOD OF COMMUNICATING TRAFFIC TO A PLURALITY OF WIRELESS DEVICES

(71) Applicant: INTEL IP CORPORATION, Santa Clara, CA (US)

(72) Inventors: Elad Oren, Tel Aviv (IL); Emily H. Qi, Camas, WA (US); Ofer Hareuveni, Haifa (IL)

(73) Assignee: INTEL IP CORPORATION, Santa Clara, CA (US)

( * ) Notice: Subject to any disclaimer, the term of this patent is extended or adjusted under 35 U.S.C. 154(b) by 52 days.

(21) Appl. No.: 14/670,513

(22) Filed: Mar. 27, 2015

(65) Prior Publication Data

US 2016/0205616 A1 Jul. 14, 2016

Related U.S. Application Data

(60) Provisional application No. 62/100,982, filed on Jan. 8, 2015.

(51) Int. Cl.
| | |
|---|---|
| *H04W 48/16* | (2009.01) |
| *H04W 4/08* | (2009.01) |
| *H04W 48/12* | (2009.01) |
| *H04W 72/00* | (2009.01) |

(52) U.S. Cl.
CPC ............ *H04W 4/08* (2013.01); *H04W 48/12* (2013.01); *H04W 72/005* (2013.01)

(58) Field of Classification Search
CPC ..... H04W 4/08; H04W 72/005; H04W 48/12; H04W 48/16
See application file for complete search history.

(56) References Cited

U.S. PATENT DOCUMENTS

| | | | |
|---|---|---|---|
| 8,687,546 B2 | 4/2014 | Gong et al. | |
| 8,824,440 B2 | 9/2014 | Ghosh et al. | |
| 8,971,229 B1 | 3/2015 | Yenganti et al. | |
| 9,060,293 B1 | 6/2015 | Vivanco et al. | |
| 9,143,979 B1 | 9/2015 | Lambert | |
| 9,544,754 B1 | 1/2017 | Lambert | |
| 2005/0249227 A1 | 11/2005 | Wang et al. | |
| 2008/0069021 A1 | 3/2008 | Chhabra | |
| 2008/0130603 A1 | 6/2008 | Wentink et al. | |
| 2011/0093536 A1* | 4/2011 | Wentink ................ | H04L 67/104 709/204 |

(Continued)

OTHER PUBLICATIONS

Office Action for U.S. Appl. No. 14/670,621, dated Jun. 15, 2016, 14 pages.

(Continued)

*Primary Examiner* — Anez Ebrahim

(74) *Attorney, Agent, or Firm* — Schichrur & Co.

(57) ABSTRACT

Some demonstrative embodiments include apparatuses, systems and/or methods of communicating traffic to a plurality of wireless devices. For example, an apparatus may include logic and circuitry configured to cause a wireless device to transmit a discovery frame in a Discovery Window (DW), the discovery frame including multicast availability information indicating at least one channel and at least one time slot after the DW; and to transmit multicast data to a plurality of wireless devices over the at least one channel and during the at least one time slot.

24 Claims, 4 Drawing Sheets

(56) References Cited

U.S. PATENT DOCUMENTS

| | | |
|---|---|---|
| 2012/0082127 A1 | 4/2012 | Wu et al. |
| 2012/0134349 A1* | 5/2012 | Jung .................... H04W 8/005 370/338 |
| 2013/0121256 A1 | 5/2013 | Backes |
| 2014/0056220 A1 | 2/2014 | Poitau et al. |
| 2014/0064160 A1 | 3/2014 | Verger et al. |
| 2014/0126417 A1 | 5/2014 | Kang et al. |
| 2015/0016322 A1 | 1/2015 | Yenganti et al. |
| 2015/0109961 A1 | 4/2015 | Patil et al. |
| 2015/0109981 A1 | 4/2015 | Patil et al. |
| 2015/0139203 A1 | 5/2015 | Miryala et al. |
| 2015/0172391 A1 | 6/2015 | Kasslin et al. |
| 2015/0172757 A1* | 6/2015 | Kafle ................ H04L 67/1044 725/81 |
| 2015/0181521 A1 | 6/2015 | Kwon et al. |
| 2015/0319675 A1 | 11/2015 | Park et al. |
| 2016/0100361 A1 | 4/2016 | Zheng et al. |
| 2016/0119738 A1 | 4/2016 | Hampel et al. |
| 2016/0127459 A1 | 5/2016 | Qi |
| 2016/0142994 A1 | 5/2016 | Luo et al. |
| 2016/0157089 A1 | 6/2016 | Qi et al. |
| 2016/0157193 A1 | 6/2016 | Qi et al. |
| 2016/0165653 A1 | 6/2016 | Liu et al. |
| 2016/0174136 A1* | 6/2016 | Patil ...................... H04L 12/18 370/312 |
| 2016/0205529 A1 | 7/2016 | Oren et al. |
| 2016/0205616 A1 | 7/2016 | Oren et al. |
| 2016/0212606 A1 | 7/2016 | Qi et al. |

OTHER PUBLICATIONS

IEEE Std 802.11™-2012. IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012, 2793 pages.

Wi-Fi Alliance, Wi-Fi Peer-to-Peer (P2P) Technical Specification Version 1.5, Aug. 4, 2014, 183 pages.

Office Action for U.S. Appl. No. 14/670,503 dated Mar. 29, 2017, 27 pages.

Office Action for U.S. Appl. No. 14/670,503, dated Oct. 26, 2016, 40 pages.

Notice of Allowance for U.S. Appl. No. 15/392,112, dated Oct. 18, 2017, 29 pages.

Notice of Allowance for U.S. Appl. No. 14/670,503, dated Jun. 14, 2017, 18 pages.

* cited by examiner

APPARATUS, SYSTEM AND METHOD OF COMMUNICATING TRAFFIC TO A PLURALITY OF WIRELESS DEVICES

CROSS REFERENCE

This application claims the benefit of and priority from U.S. Provisional Patent Application No. 62/100,982 entitled "Communicating Traffic to a Plurality of Wireless Devices", filed Jan. 8, 2015, the entire disclosure of which is incorporated herein by reference.

TECHNICAL FIELD

Embodiments described herein generally relate to communicating traffic to a plurality of wireless devices.

BACKGROUND

In some wireless communication networks, communication may be performed during discovery windows (DWs).

Stations may be allowed to transmit a discovery frame during a DW, in order to enable the stations to discover other devices or services that are running on the other devices.

Transmissions may be preformed during the DW based on a contention mechanism.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
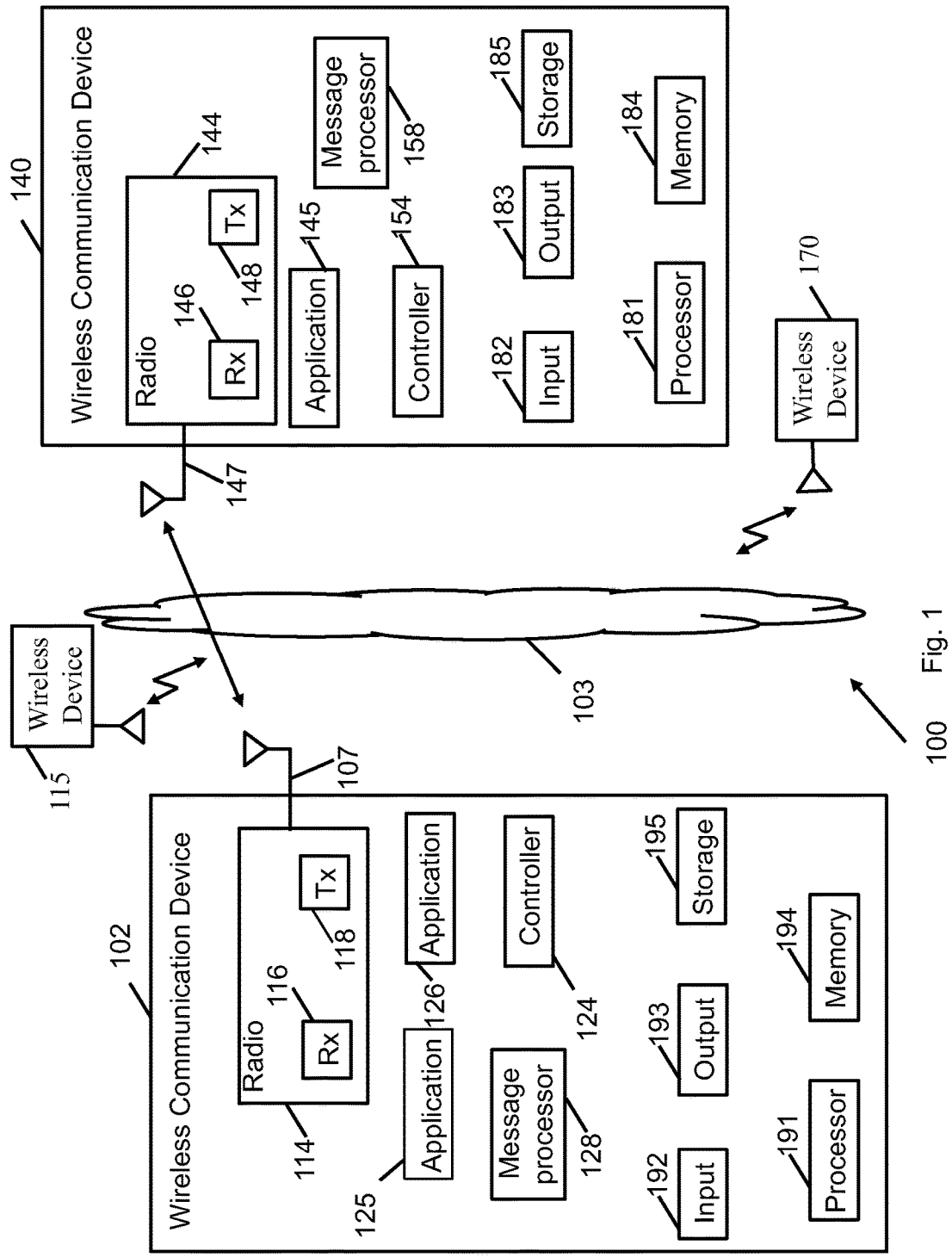
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with devices and/or networks operating in accordance with existing Wireless Fidelity (WiFi) Alliance (WFA) Specifications (including WFA Neighbor Awareness Networking (NAN) Specification) and/or future versions and/or derivatives thereof, devices and/or networks operating in accordance with existing WFA Peer-to-Peer (P2P) specifications (*WiFi P2P technical specification, version* 1.2, 2012) and/or future versions and/or derivatives thereof, devices and/or networks operating in accordance with existing Wireless-Gigabit-Alliance (WGA) specifications (*Wireless Gigabit Alliance, Inc WiGig MAC and PHY Specification Version* 1.1, April 2011, *Final specification*) and/or future versions and/or derivatives thereof, devices and/or networks operating in accordance with existing IEEE 802.11 standards (*IEEE 802.11-2012, IEEE Standard for Information technology— Telecommunications and information exchange between systems Local and metropolitan area networks—Specific requirements Part* 11: *Wireless LAN Medium Access Control* (*MAC*) *and Physical Layer* (*PHY*) *Specifications*, Mar. 29, 2012; *IEEE*802.11*ac*-2013 (*"IEEE P*802.11*ac*-2013, *IEEE Standard for Information Technology—Telecommunications and Information Exchange Between Systems—Local and Metropolitan Area Networks—Specific Requirements—Part* 11: *Wireless LAN Medium Access Control* (*MAC*) *and Physical Layer* (*PHY*) *Specifications—Amendment* 4: *Enhancements for Very High Throughput for Operation in Bands below* 6 *GHz*", December, 2013); *IEEE* 802.11*ad* (*"IEEE P*802.11*ad*-2012, *IEEE Standard for Information Technology—Telecommunications and Information Exchange Between Systems—Local and Metropolitan Area Networks—Specific Requirements—Part* 11: *Wireless LAN Medium Access Control* (*MAC*) *and Physical Layer* (*PHY*) *Specifications—Amendment* 3: *Enhancements for Very High Throughput in the* 60 *GHz Band*", 28 Dec., 2012); and/or IEEE-802.11REVmc (*"IEEE* 802.11*-REVmc™/D*3.0, *June* 2014 *draft standard for Information technology—Telecommunications and information exchange between systems Local and metropolitan area networks Specific requirements; Part* 11: *Wireless LAN Medium Access Control* (*MAC*) *and Physical Layer* (*PHY*) *Specification"*)) and/or future versions and/or derivatives thereof, devices and/or networks operating in accordance with existing cellular specifications and/or protocols, e.g., 3rd Generation Partnership Project (3GPP), 3GPP Long Term Evolution (LTE)

and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Orthogonal Frequency-Division Multiple Access (OFDMA), FDM Time-Division Multiplexing (TDM), Time-Division Multiple Access (TDMA), Multi-User MIMO (MU-MIMO), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device.

Some demonstrative embodiments may be used in conjunction with a WLAN, e.g., a wireless fidelity (WiFi) network. Other embodiments may be used in conjunction with any other suitable wireless communication network, for example, a wireless area network, a "piconet", a WPAN, a WVAN and the like.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

The term "station" (STA), as used herein, may include any logical entity that is a singly addressable instance of a medium access control (MAC) and a physical layer (PHY) interface to a wireless medium (WM).

The phrase "peer to peer (PTP) communication", as used herein, may relate to device-to-device communication over a wireless link ("peer-to-peer link") between devices. The PTP communication may include, for example, a WiFi Direct (WFD) communication, e.g., a WFD Peer to Peer (P2P) communication, wireless communication over a direct link within a QoS basic service set (BSS), a tunneled direct-link setup (TDLS) link, a STA-to-STA communication in an independent basic service set (IBSS), or the like.

Some demonstrative embodiments are described herein with respect to WiFi communication. However, other embodiments may be implemented with respect to any other communication scheme, network, standard and/or protocol.

Reference is now made to FIG. 1, which schematically illustrates a block diagram of a system 100, in accordance with some demonstrative embodiments.

As shown in FIG. 1, in some demonstrative embodiments system 100 may include a wireless communication network including one or more wireless communication devices, e.g., wireless communication devices 102, 115, 170 and/or 140.

In some demonstrative embodiments, wireless communication devices 102, 115, 170 and/or 140 may include, for example, a UE, an MD, a STA, an AP, a PC, a desktop computer, a mobile computer, a laptop computer, an Ultrabook™ computer, a notebook computer, a tablet computer, a server computer, a handheld computer, a handheld device, an Internet of Things (IoT) device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD)

player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

In some demonstrative embodiments, device 102, 170 and/or device 115 may include, for example, one or more of a processor 191, an input unit 192, an output unit 193, a memory unit 194, and a storage unit 195; and/or device 140 may include, for example, one or more of a processor 181, an input unit 182, an output unit 183, a memory unit 184, and a storage unit 185. Devices 102 and/or 140 may optionally include other suitable hardware components and/or software components. In some demonstrative embodiments, some or all of the components of one or more of devices 102, 115, 170 and/or 140 may be enclosed in a common housing or packaging, and may be interconnected or operably associated using one or more wired or wireless links. In other embodiments, components of one or more of devices 102, 115, 170 and/or 140 may be distributed among multiple or separate devices.

Processor 191 and/or processor 181 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 191 executes instructions, for example, of an Operating System (OS) of device 102 and/or of one or more suitable applications. Processor 181 executes instructions, for example, of an Operating System (OS) of device 140 and/or of one or more suitable applications.

Input unit 192 and/or input unit 182 includes, for example, a keyboard, a keypad, a mouse, a touch-screen, a touch-pad, a track-ball, a stylus, a microphone, or other suitable pointing device or input device. Output unit 193 and/or output unit 183 includes, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

Memory unit 194 and/or memory unit 184 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 and/or storage unit 185 includes, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by device 102. Memory unit 184 and/or storage unit 185, for example, may store data processed by device 140.

In some demonstrative embodiments, wireless communication devices 102, 115, 170 and/or 140 may be capable of communicating content, data, information and/or signals via a wireless medium (WM) 103. In some demonstrative embodiments, wireless medium 103 may include, for example, a radio channel, a cellular channel, a Global Navigation Satellite System (GNSS) Channel, an RF channel, a Wireless Fidelity (WiFi) channel, an IR channel, a Bluetooth (BT) channel, and the like.

In some demonstrative embodiments, wireless communication medium 103 may include a wireless communication channel over a 2.4 Gigahertz (GHz) frequency band, a 5 GHz frequency band, a millimeterWave (mmWave) frequency band, e.g., a 60 GHz frequency band, a Sub 1 Gigahertz (S1G) band, and/or any other frequency band.

In some demonstrative embodiments, devices 102, 115, 170 and/or 140 may include one or more radios including circuitry and/or logic to perform wireless communication between devices 102, 115, 170, 140 and/or one or more other wireless communication devices. For example, device 102 may include a radio 114, and/or device 140 may include a radio 144.

In some demonstrative embodiments, radios 114 and/or 144 may include one or more wireless receivers (Rx) including circuitry and/or logic to receive wireless communication signals, RF signals, frames, blocks, transmission streams, packets, messages, data items, and/or data. For example, radio 114 may include a receiver 116, and/or radio 144 may include a receiver 146.

In some demonstrative embodiments, radios 114 and/or 144 may include one or more wireless transmitters (Tx) including circuitry and/or logic to send wireless communication signals, RF signals, frames, blocks, transmission streams, packets, messages, data items, and/or data. For example, radio 114 may include a transmitter 118, and/or radio 144 may include a transmitter 148.

In some demonstrative embodiments, radios 114 and/or 144 may be configured to communicate over a 2.4 GHz band, a 5 GHz band, a mmWave band, a S1G band, and/or any other band.

In some demonstrative embodiments, radios 114 and/or 144 may include circuitry and/or logic, modulation elements, demodulation elements, amplifiers, analog to digital and digital to analog converters, filters, and/or the like. In one example, radios 114 and/or 144 may include or may be implemented as part of a wireless Network Interface Card (NIC), and the like.

In some demonstrative embodiments, radios 114 and/or 144 may include, or may be associated with, one or more antennas 107 and/or 147, respectively.

In one example, device 102 may include a single antenna 107. In other example, device 102 may include two or more antennas 107.

In one example, device 140 may include a single antenna 147. In other example, device 140 may include two or more antennas 147.

Antennas 107 and/or 147 may include any type of antennas suitable to transmit and/or receive wireless communication signals, blocks, frames, transmission streams, packets, messages and/or data. For example, antennas 107 and/or 147 may include any suitable configuration, structure and/or arrangement of one or more antenna elements, components, units, assemblies and/or arrays. Antennas 107 and/or 147 may include, for example, antennas suitable for directional communication, e.g., using beamforming techniques. For example, antennas 107 and/or 147 may include a phased array antenna, a multiple element antenna, a set of switched beam antennas, and/or the like. In some embodiments, antennas 107 and/or 147 may implement transmit and receive functionalities using separate transmit and receive antenna elements. In some embodiments, antennas 107 and/or 147 may implement transmit and receive functionalities using common and/or integrated transmit/receive elements.

In some demonstrative embodiments, wireless communication devices 102, 115, 170 and/or 140 may form, and/or may communicate as part of, a wireless local area network (WLAN).

In some demonstrative embodiments, wireless communication devices 102, 115, 170 and/or 140 may form, and/or may communicate as part of, a WiFi network.

In some demonstrative embodiments, wireless communication devices 102, 115, 170 and/or 140 may form, and/or may communicate as part of, a WiFi Direct (WFD) network, e.g., a WiFi direct services (WFDS) network, and/or may perform the functionality of one or more WFD devices.

In one example, device 102, 115, 170 and/or device 140 may include, or may perform the functionality of a WiFi Direct device.

In some demonstrative embodiments, wireless communication devices 102, 115, 170 and/or 140 may be capable of performing awareness networking communications, for example, according to an awareness protocol, e.g., a WiFi aware protocol, and/or any other protocol, e.g., as described below.

In some demonstrative embodiments, wireless communication devices 102, 115, 170 and/or 140 may include an awareness networking device.

In some demonstrative embodiments, wireless communication devices 102, 115, 170 and/or 140 may be capable of forming, and/or communicating as part of, a Neighbor Awareness Networking (NAN) network, e.g., a WiFi NAN, and/or may perform the functionality of one or more NAN devices.

In some demonstrative embodiments, wireless communication devices 102, 115, 170 and/or 140 may include a NAN device.

In other embodiments, wireless communication devices 102, 115, 170 and/or 140 may include any other wireless devices.

In some demonstrative embodiments, wireless communication medium 103 may include a direct link, for example, a PTP link, e.g., a WiFi direct P2P link, for example, to enable direct communication between device 102 and device 140.

In some demonstrative embodiments, wireless communication devices 102, 115, 170 and/or 140 may perform the functionality of WFD P2P devices. For example, devices 102, 115, 170 and/or 140 may be able to perform the functionality of a P2P client device, and/or P2P group Owner (GO) device.

In other embodiments, wireless communication devices 102, 115, 170 and/or 140 may form, and/or communicate as part of, any other network and/or perform the functionality of any other wireless devices or stations.

In some demonstrative embodiments, devices 102, 115, 170 and/or 140 may include one or more applications configured to provide, share, and/or to use one or more services, e.g., a social application, a file sharing application, a media application and/or the like, for example, using an awareness network, NAN network, a PTP network, a P2P network, WFD network, or any other network.

In some demonstrative embodiments, device 102 may execute an application 125 and/or an application 126. In some demonstrative embodiments, device 140 may execute an application 145.

In some demonstrative embodiments, devices 102, 115, 170 and/or 140 may be capable of sharing, showing, sending, transferring, printing, outputting, providing, synchronizing, and/or exchanging content, data, and/or information, e.g., between application 154 and applications 125 and/or 126.

In some demonstrative embodiments, devices 102, 115, 170 and/or 140 may include a controller configured to control one or more functionalities of devices 102, 115, 170 and/or 140, for example, one or more functionalities of communication, e.g., awareness networking communications, NAN communication and/or any other communication, between devices 102, 115, 170 and/or 140 and/or other devices, and/or any other functionality, e.g., as described below. For example, device 102 may include a controller 124, and/or device 140 may include a controller 154.

In some demonstrative embodiments, controllers 124 and/or 154 may include circuitry and/or logic, e.g., one or more processors including circuitry and/or logic, memory circuitry and/or logic, Media-Access Control (MAC) circuitry and/or logic, Physical Layer (PHY) circuitry and/or logic, and/or any other circuitry and/or logic, configured to perform the functionality of controllers 124 and/or 154. Additionally or alternatively, one or more functionalities of controllers 124 and/or 154 may be implemented by logic, which may be executed by a machine and/or one or more processors, e.g., as described below. In one example, controllers 124 and/or 154 may include one or more processors having circuitry and/or logic to cause a device or a station, e.g., devices 102 and/or 140, to perform one or more functionalities, e.g., as described herein.

In some demonstrative embodiments, device 102 may include a message processor 128 configured to generate, process and/or access one or messages communicated by device 102.

In one example, message processor 128 may be configured to generate one or more messages to be transmitted by device 102, and/or message processor 128 may be configured to access and/or to process one or more messages received by device 102, e.g., as described below.

In some demonstrative embodiments, device 140 may include a message processor 158 configured to generate, process and/or access one or messages communicated by device 140.

In one example, message processor 158 may be configured to generate one or more messages to be transmitted by device 140, and/or message processor 158 may be configured to access and/or to process one or more messages received by device 140, e.g., as described below.

In some demonstrative embodiments, message processors 128 and/or 158 may include circuitry and/or logic, e.g., one or more processors including circuitry and/or logic, memory circuitry and/or logic, Media-Access Control (MAC) circuitry and/or logic, Physical Layer (PHY) circuitry and/or logic, and/or any other circuitry and/or logic, configured to perform the functionality of message processors 128 and/or 158. Additionally or alternatively, one or more functionalities of message processors 128 and/or 158 may be implemented by logic, which may be executed by a machine and/or one or more processors, e.g., as described below.

In some demonstrative embodiments, at least part of the functionality of message processor 128 may be implemented as part of radio 114, and/or at least part of the functionality of message processor 158 may be implemented as part of radio 144.

In some demonstrative embodiments, at least part of the functionality of message processor 128 may be implemented as part of controller 124, and/or at least part of the functionality of message processor 158 may be implemented as part of controller 154.

In other embodiments, the functionality of message processor 128 may be implemented as part of any other element of device 102, and/or the functionality of message processor 158 may be implemented as part of any other element of device 104.

In some demonstrative embodiments, devices 102, 115, 170 and/or 140 may perform the functionality of a device or station, for example, an awareness networking device, a NAN device, a WiFI device, a WFD device, a WLAN device and/or any other device, capable of discovering other devices according to a discovery protocol and/or scheme.

In some demonstrative embodiments, radios 114 and/or 144 may communicate over wireless communication medium 103 according to an awareness networking scheme, for example, a discovery scheme, for example, a NAN discovery scheme, or any other awareness networking and/or discovery scheme, e.g., as described below.

In some demonstrative embodiments, the awareness networking scheme, e.g., NAN, may enable applications to discover services in their close proximity. For example, the NAN technology may be a low power service discovery, which may, for example, scale efficiently, e.g., in dense Wi-Fi environments.

In some demonstrative embodiments, a device, e.g., device 102, device 115, device 170, and/or device 140, may include one or more blocks and/or entities to perform network awareness functionality. For example, devices 102, 115, 170 and/or 140 may include a NAN MAC and/or a Discovery Engine (DE). In one example, controllers 124 and/or 154 may be configured to perform the functionality of the NAN MAC and/or the Discovery Engine. In another example, the functionality of the NAN MAC and/or the Discovery Engine may be performed by any other element and/or entity of devices 102, 115, 170 and/or 140.

In some demonstrative embodiments, the awareness networking scheme may include a discovery scheme or protocol, e.g., as described below.

In some demonstrative embodiments, devices 102, 115, 170 and/or 140 may perform a discovery process according to the awareness networking scheme, for example, to discover each other and/or to establish a wireless communication link, e.g., directional and/or high throughput wireless communication link and/or any other link.

In some demonstrative embodiments, devices 102, 115, 170 and/or 140 may be configured to enable time synchronization between device 102, device 115, device 170, device 140 and/or one or more other devices, e.g., performing the functionality of Wi-Fi stations (STAs), for example, such that STAs can discover each other more efficiently and/or quickly.

Some demonstrative embodiments are described below with respect to a NAN discovery scheme, and to NAN discovery frames of the NAN discovery scheme. However, in other embodiments, any other discovery scheme and/or discovery frames may be used.

In some demonstrative embodiments, the discovery scheme may include a plurality of contention-based discovery windows (DWs).

In some demonstrative embodiments, communication during the DWs may be configured to enable time synchronization between Wi-Fi stations (STAs), e.g., devices 102, 115, 170 and/or 140, so that STAs can find each other more efficiently during a DW.

In some demonstrative embodiments, devices of an awareness network, e.g. a NAN network, may form one or more clusters, e.g., in order to publish and/or subscribe for services.

In some demonstrative embodiments, devices 102, 115, 170 and/or 140 may form an awareness cluster.

In some demonstrative embodiments, devices 102, 115, 170 and/or 140 may belong to the same awareness cluster.

In some demonstrative embodiments, the awareness cluster may include a NAN cluster.

In some demonstrative embodiments, the NAN cluster may be defined by an Anchor Master (AM). In one example, the AM may include a NAN device, which has the highest rank in the NAN cluster. In other embodiments, the NAN cluster may be defined by any other device, for example, a master device, an anchor device, a manager device, and the like.

In some demonstrative embodiments, NAN data exchange may be reflected by service discovery frames (SDF), e.g., Publish, Subscribe and/or Follow-Up Service discovery frames (SDF). These frames may include public action frames, which may be sent by a device that wishes to publish a service/application, and/or to subscribe to a published service/application at another end.

In one example, one of devices 102, 115, 170 and/or 140, e.g., device 102, may perform the functionality of an AM. The AM may be configured to transmit one or more beacons. Another one of devices 102, 115, 170 and/or 140, e.g., device 140, may be configured to receive and process the beacons.

In another example, devices 102, 115, 170 and/or 140 may perform the functionality of NAN devices, e.g., belonging to a NAN cluster, which may share a common set of NAN parameters, for example, including a common NAN timestamp, and/or a common time period between consecutive discovery windows (DWs), e.g., as described below. The NAN timestamp may be communicated, for example, as part of a NAN beacon frame, which may be communicated in the NAN cluster. In one example, the NAN timestamp may include a Time Synchronization Function (TSF) value, for example, a NAN cluster TSF value, or any other value.

In some demonstrative embodiments, devices 102, 115, 170 and/or 140 may be configured to discover one another over a predefined communication channel ("the social channel"). In one example, the Channel 6 in the 2.4 GHz band may be defined as the NAN social channel. Any other channel may be used as the social channel.

In some demonstrative embodiments, devices 102, 115, 170 and/or 140 may transmit the discovery frames, e.g., SDFs, during the plurality of DWs, e.g., over the NAN social channel.

In one example, devices 102, 115, 170 and/or 140 may transmit the discovery frames to discover each other, for example, to enable using the one or more services provided by applications 125, 126 and/or 145.

In some demonstrative embodiments, devices 102, 115, 170 and/or 140 may communicate during a DW according to a contention mechanism. For example, devices 102, 115, 170 and/or 140 may check whether or not a wireless communication channel is unoccupied prior to an attempt to transmit a service discovery frame during the discovery window.

In some demonstrative embodiments, a device of devices 102, 115, 170 and/or 140, e.g., device 102, may not transmit the discovery frame during the DW, e.g., if the channel is occupied. In some demonstrative embodiments, device 102 may transmit the discovery frame during the DW, e.g., if the channel is unoccupied.

In some embodiments, the service discovery frame may be transmitted as a group addressed, e.g., broadcast or multicast, discovery frame. In other embodiments, the discovery frame may be transmitted as any other type of frame.

In some demonstrative embodiments, the service discovery frame may not require an acknowledgement frame. According to these embodiments, a transmitter of the discovery frame may not backoff a transmission of the service discovery frame.

In some demonstrative embodiments, the service discovery frame transmitted by device 102 during the DW may be configured to enable other devices and/or services that are running on other devices to discover services on device 102.

In some demonstrative embodiments, devices of system 100 may utilize availability information, e.g., in the form of an availability interval bitmap and/or a further availability map ("further availability" information), for example, to allow a device of devices 102, 115, 170 and/or 140, to advertise its availability, for example, in terms of at least one channel and one or more timeslots, during which the device may be available, e.g., in an active mode ("awake mode"), for example, to perform post NAN activities.

In one example, the availability information may be communicated as part of an availability attribute of the service discovery frame.

In some demonstrative embodiments, the availability attribute may include, for example, a 32-bit bitmap corresponding to 32 timeslots, e.g., each timeslot is 16 milliseconds (ms) long.

In one example, each bit of the 32-bit bitmap that is not zero may represent a time slot, during which a device sending the availability attribute is to be awake and available during the time slot to send and/or receive data.

In some demonstrative embodiments, it may be inefficient and/or disadvantageous to exchange data between awareness networking devices, for example, by forming a P2P link or another non-NAN link between the devices. For example, a first NAN device that wishes to exchange data with a second NAN device may send to the second NAN device an availability attribute to indicate the channels and the time slots, during which the first device is available to exchange data. The first and second NAN devices may then use a post-discovery method, for example, by using an infrastructure or a peer-to-peer (P2P) network to exchange the data.

In some demonstrative embodiments, devices 102, 115, 170 and/or 140, may be configured to use an awareness networking protocol, for example, the NAN protocol, to exchange data, e.g., in addition to the exchanging of the service discovery frames, for example, even without the need to use a different connection mechanism, for example, even without using a connection via the infrastructure or the P2P network, e.g., as described below.

In some demonstrative embodiments, devices 102, 115, 170 and/or 140 may be configured to exchange data via an awareness networking communication link, for example, NAN Data Link (NDL).

In some demonstrative embodiments, devices 102, 115, 170 and/or 140 may use the mechanism of the further availability, e.g., as described above, for example, to coordinate one or more channels and/or time slots, in which devices 102, 115, 170 and/or 140 may meet to exchange data traffic, e.g., unicast traffic.

For example, the further availability mechanism may be used to exchange data between a first device of a cluster, e.g., device 102, and a second device of the cluster, e.g., device 140.

In some demonstrative embodiments, two or more devices of the cluster may form a group.

In some demonstrative embodiments, a group of NAN devices may include more than one NAN device.

In some demonstrative embodiments, the group of NAN devices may include any logical group, for example, a group, which may be formed, for example, based on devices that share a specific application/service or some other common identifier within the NAN cluster.

In some demonstrative embodiments, all the devices in the group of NAN devices may be in the same NAN cluster. For example, devices 102, 115, 170 and/or 140 may belong to a group and may be in the same NAN cluster.

In some demonstrative embodiments, one or more groups, e.g., a single group or a plurality of groups, may be formed in a NAN cluster. For example, devices 102, 115, and 140 may form a first group, and/or devices 102, 170 and 140 may form a second group.

In some demonstrative embodiments, a group may be defined to include a NAN device including an application ("the publisher NAN device") and one or more NAN devices, which may subscribe to a service provided by the application.

In some demonstrative embodiments, devices 102, 115 and 140 may form a group of NAN devices within the cluster.

In some demonstrative embodiments, device 102 may perform the functionality of the publisher NAN device, which may join a NAN cluster, and may publish a service provided by an application, for example, application 125, e.g. a gaming application.

In some demonstrative embodiments, one or more other NAN devices, e.g., device 115 and/or device 140, may join the NAN cluster, and may subscribe to the service published by the publisher NAN device.

Some demonstrative embodiments may enable multicast traffic, e.g., multicast transmission, within a group ("a multicast group") of NAN devices, which belong to the same cluster. For example, embodiments described herein may enable multicast traffic between a group including devices 102, 115 and 140.

Some demonstrative embodiments are described herein with reference to a multicast transmission to a multicast group. Other embodiments may include or may be implemented with respect to a multi-user transmission, multi-device transmission, multi-station transmission, group transmission, or any other transmission to a plurality of devices, stations, users and/or destinations.

In some demonstrative embodiments, devices 102, 115 and/or 140 may be configured to enable delivery of traffic from a device, e.g., device 102, to a plurality of devices, e.g., including devices 115 and/or 140, for example, in the form of multicast traffic, group-addressed traffic, multi-user traffic, or any other form of traffic to be received by a plurality of devices.

In one example, a multicast transmission may be used in a multi-player gaming application, for example, to enable one of the players to send a message to all of the others players. In another example, a multicast transmission may be used in a multi-user music sharing application.

In some demonstrative embodiments, the ability to communicate multicast traffic, group-addressed traffic, and/or multi-user traffic may improve channel efficiency significantly, for example, particularly, with multicast video streaming, audio streaming, and/or any other traffic.

Some demonstrative embodiments may be implemented, for example, to allow a device, e.g., device 102, to deliver multicast traffic to a multicast group, for example, including devices 115 and/or 140, e.g., even without establishing a P2P group with the devices.

In some demonstrative embodiments, devices 102, 115 and/or 140 may be configured to coordinate a channel and/or a time slot to communicate the multicast traffic, e.g., as described below.

In some demonstrative embodiments, device 102, 115 and/or 140 may perform the coordination, for example, on the NAN channel, e.g., the social channel, and/or within a NAN DW.

In some demonstrative embodiments, the exchange of the multicast traffic within the multicast group may be performed during a time slot, which may be different from the discovery window, and/or on a different channel than the NAN channel.

In some demonstrative embodiments, a device, e.g., one device, of the multicast group of the NAN devices may be configured to coordinate the time slot and the channel over which the exchange of the multicast traffic within the multicast group may be performed.

In some demonstrative embodiments, the device may perform the functionality of a coordinator of the multicast group, for example, to coordinate the time slot and the channel, e.g., as described below.

In some demonstrative embodiments, the coordinator of the group may be elected, for example, according to a coordinator election criterion, algorithm, scheme and/or procedure, e.g., as described below.

In some demonstrative embodiments, the coordinator of the group may be elected, for example, according to a distributed election algorithm, scheme and/or procedure, e.g., as described below.

In some demonstrative embodiments, the coordinator of the group may coordinate and/or set the further availability time slot and/or channel to communicate the multicast data exchange between devices of the group, e.g., as described below.

In some demonstrative embodiments, the coordinator of the group may be configured to send to the group, e.g., advertise to the group, availability information ("the multicast availability information"), e.g., in the form of a multicast availability bitmap to which the other devices can align, e.g., to communicate the multicast traffic. The multicast availability information may indicate, for example, one or more time slots and/or channels, during which multicast traffic may be communicated by devices of the multicast group, e.g., as described below.

In some demonstrative embodiments, the coordinator of the group may be configured to send a multicast availability bitmap. For example, the devices of the group may be configured to exchange multicast data in the available timeslots, e.g., according to the multicast availability bitmap provided by the coordinator of the group.

In some demonstrative embodiments, the coordinator of the group may send the multicast availability information as part of a multicast schedule message ("multicast schedule frame"), e.g. as described below.

In some demonstrative embodiments, the multicast schedule message may be configured to schedule the one or more time slots and/or channels, during which the multicast traffic may be communicated by devices of the multicast group.

In some demonstrative embodiments, the coordinator of the group may send the multicast schedule message to the devices of the multicast group during one or more DWs, for example, during each DW of a NAN cluster including the devices of the group.

In some demonstrative embodiments, there may be a coordinator for a group, for example, whenever a size of the group, e.g., a number of devices in the group, is greater than one.

In some demonstrative embodiments, device 102 may perform the functionality of the coordinator of the group.

In some demonstrative embodiments, controller 124 may cause device 102 to become the coordinator of the multicast group, e.g., as described below.

In some demonstrative embodiments, controller 124 may cause device 102 to select if to become the coordinator of the multicast group, for example, to replace an active coordinator of the group, for example, device 170, e.g., as described below.

In some demonstrative embodiments, controller 124 may cause radio 114 to transmit a discovery frame in a DW.

In some demonstrative embodiments, the discovery frame may include a service discovery frame (SDF).

In some demonstrative embodiments, the service discovery frame may include a NAN service discovery frame.

In some demonstrative embodiments, the NAN SDF may include a publish action frame. For example, the NAN SDF may be a public action frame.

In other embodiments, the public action frame may include any other type of frame, e.g., a dedicated public action frame.

In some demonstrative embodiments, the discovery frame may include multicast availability information indicating at least one channel and at least one time slot, e.g., after the DW.

In one example, the multicast availability information may include the availability bitmap to define the time slots and/or channels to be available for communicating multicast data.

In one example, each bit of the 32-bit bitmap that is not zero may represent a time slot, during which devices of the multicast group are to be awake and available for communicating multicast data.

In some demonstrative embodiments, controller 124 may cause radio 114 to transmit the multicast schedule message as part of the discovery frame.

In some demonstrative embodiments, controller 124 may cause radio 114 to transmit the discovery frame, e.g., including the multicast schedule message, during each of a sequence of DWs.

In some demonstrative embodiments, devices of the multicast group, e.g., devices 140 and/or 115, may receive the discovery frame including the multicast availability information.

In one example, the devices may be configured to schedule the one or more time slots and/or channels, during which the multicast traffic may be communicated by devices of the multicast group, for example, based on the multicast schedule message.

In some demonstrative embodiments, the devices may process the multicast schedule message, and may be available to receive multicast data over the at least one channel and during the at least one time slot, for example, according to the channel and the time slot defined by the multicast availability information.

In some demonstrative embodiments, controller 124 may cause radio 114 to transmit multicast data to a plurality of wireless devices over the at least one channel and during the at least one time slot. For example, radio 114 may transmit the multicast data to devices 140 and/or 115 of the multicast group.

In one example, device 102 may send a broadcast publish action frame, e.g., including the multicast schedule message, which may be received by all devices in the NAN cluster, to which device 102 belongs.

For example, device 102 may specify the action frame is to be processed by the devices of the multicast group, for example, by specifying which devices of the NAN cluster are to be allowed to process the action frame, e.g., by using an address set filter, a bloom filter and/or any other filtering mechanism.

In some demonstrative embodiments, device 102 may be elected as the coordinator, for example, when establishing a group.

In some demonstrative embodiments, device 102 may be elected as the coordinator, for example, to replace an active coordinator, e.g., device 170.

In some demonstrative embodiments, device 102 may be elected as the coordinator, for example, when the active coordinator is unavailable.

In one example, at a certain discovery window, an active coordinator of the multicast group may not be awake, for example, if the awareness networking scheme does not guarantee that each device of the multicast group will be available. Accordingly, it may not be guaranteed that the active coordinator of the multicast group may be available during the certain discovery window.

In some demonstrative embodiments, devices of the multicast group may be configured to elect a new coordinator, for example, instead of the active coordinator, e.g., when the active coordinator is unavailable.

In some demonstrative embodiments, the devices of the multicast group may be configured to perform one or more operations and/or communications to elect the new coordinator.

In some demonstrative embodiments, a device of the multicast group may be configured to detect and/or to determine that the coordinator of the multicast group is unavailable.

In one example, a device of the group, e.g., a device which is not performing the functionality of the coordinator, may determine that the coordinator of the group has left the group and/or has become unavailable, for example, if the device does not receive the multicast scheduling message, e.g., a discovery frame including the multicast scheduling message, for a predefined number of consecutive DWs, e.g., three DWs, or any other number of DWs.

In some demonstrative embodiments, the device, which determines that the coordinator of the group has left the group and/or has become unavailable, may initiate an election algorithm, for example, to choose the new coordinator, e.g., as described below.

In some demonstrative embodiments, a device of the group, e.g., each device of the group, for example, devices 102, 115 and/or 140, may have a list of the devices in the group. For example, device 104 may have a list including device 102 and 115.

In some demonstrative embodiments, the list of the devices in the group may be provided to the devices of the group, for example, by an application, which may be used and/or shared between the devices of the group, and/or by any other device or source.

In some demonstrative embodiments, the list of the devices in the group may include identifiers of all the devices in the group.

In some demonstrative embodiments, the application, which may be used and/or shared between the devices of the group, may be configured to update the list of the devices in the group.

In some demonstrative embodiments, the identifiers of the list of the devices in the group may be updated, for example, every time a device of the NAN cluster subscribes to the service provided by the application, e.g., as described below.

In some demonstrative embodiments, the list provided to a device may include available or known devices in the proximity to the device.

In some demonstrative embodiments, the list of the devices of the group may not be updated on each discovery window time slot. Accordingly, the list of the devices may possibly include devices, which are unavailable.

In some demonstrative embodiments, device 102 may perform the functionality of a NAN device ("the publisher NAN device"), which may join a NAN cluster, and may publish a service provided by an application, for example, application 125, e.g., a gaming application.

In some demonstrative embodiments, one or more other NAN devices, e.g., device 115 and/or device 140, may join the NAN cluster, and may subscribe to the service published by application 125.

In some demonstrative embodiments, application 125 may be configured to receive and/or process identifiers of the one or more other NAN devices, which participate in the NAN cluster and subscribe to the service provided by application 125.

In one example, whenever a NAN device is subscribing to the service provided by application 125, a database in a server corresponding to application 125, e.g., on the web or any other server, may be updated with an identifier of the NAN device being subscribed to the service.

In some demonstrative embodiments, the identifier of the NAN device may include a MAC address of the NAN device, or any other address or value configured to identify the NAN device.

In some demonstrative embodiments, application 125 may be configured to maintain a list of identifiers, e.g., MAC addresses, of devices that are participating in the NAN cluster and have subscribed to application 125.

In some demonstrative embodiments, application 125 may be configured to update the list of identifiers to include, for example, devices 115 and/or 140, which may subscribe to application 125.

In some demonstrative embodiments, one or more devices, which subscribe to application 125, e.g., devices 115 and/or 140, may be able to access the list of identifiers.

In some demonstrative embodiments, devices 102, 115, 170 and/or 140 may form a multicast group.

In some demonstrative embodiments, device 170 may perform the functionality of the active coordinator of the multicast group.

In some demonstrative embodiments, device 170 may become unavailable and/or may leave the multicast group.

In some demonstrative embodiments, device 140 may determine that device 170 becomes unavailable, for example, if device 140 does not receive the multicast scheduling message, e.g., a discovery frame including multicast availability information, from device 170 for a predefined number of consecutive DWs, e.g., three DWs.

In some demonstrative embodiments, device 140 may initiate an election procedure to elect a new coordinator, e.g., as described below.

In some demonstrative embodiments, device 140 may initiate the election procedure, for example, to become the new coordinator of the group, e.g., instead of device 170.

In some demonstrative embodiments, device 140 may control and/or may be responsible of the election procedure to elect a new coordinator, e.g., as described below.

In some demonstrative embodiments, the election procedure may include an exchanging of election frames and response frames, e.g., as described below.

In some demonstrative embodiments, an election frame transmitted from a first device of the multicast group may indicate that the first device is to control and/or be responsible for the election procedure, and/or to indicate that the first device is to become the coordinator of the multicast group, e.g., as described below.

In some demonstrative embodiments, a second device of the multicast group may be configured to indicate to other devices of the multicast group, e.g., including the first device, that the second device is to take over control of the election procedure, e.g., as described below.

In some demonstrative embodiments, the second device may transmit a response frame, e.g., in response to the election frame from the first device, for example, to indicate to the first device that the second device is to take over control of the election procedure.

In some demonstrative embodiments, the first device may receive the response frame, and may stop to send election frames, e.g., as described below.

In some demonstrative embodiments, controller 154 may cause radio 144 to transmit a first election frame in a DW to the multicast group including device 140. For example, controller 154 may cause radio 144 to transmit the first election frame in the DW to devices 102 and 115, which are included in the multicast group.

In some demonstrative embodiments, controller 154 may cause radio 144 to transmit the first election frame to devices 102 and 115, for example, based on the list of identifiers of the devices belonging to the multicast group.

In some demonstrative embodiments, the first election frame may indicate device 140 is to be elected as a coordinator of the multicast group.

In some demonstrative embodiments, the first election frame may include a MAC address of the wireless device 140.

In some demonstrative embodiments, device 140 may become the coordinator of the multicast group, for example, if no response to the first election frame is received within a predefined time period.

In some demonstrative embodiments, device 140 may transmit a multicast scheduling message, e.g., a discovery frame including the multicast availability information, indicating at least one channel and at least one time slot, for example, if device 140 becomes the coordinator of the group.

In one example, device 140 may transmit the discovery frame including the multicast availability information, for example, to coordinate the channel and the time slot to the multicast group.

In some demonstrative embodiments, device 140 may not become the coordinator of the multicast group, for example, if a response to the first election frame is received by device 140 within the predefined time period, e.g., as described below.

In some demonstrative embodiments, devices 102 and 115 may receive the first election frame indicating that device 140 is to be elected as the coordinator of a multicast group.

In some demonstrative embodiments, controller 124 may determine whether or not device 102 should be elected as the new coordinator, for example, instead of device 140.

In some demonstrative embodiments, controller 124 may determine whether or not device 102 should be elected as the new coordinator, for example, based on a comparison between the MAC address of device 102 and the MAC address of the sender of the first election frame, e.g., device 140.

In some demonstrative embodiments, controller 124 may cause radio 114 not to respond to the to the first election frame, for example, if controller 124 determines that device 102 should not be elected as the new coordinator, e.g., as described below.

In some demonstrative embodiments, controller 124 may cause radio 114 to respond to the to the first election frame, for example, if controller 124 determines that device 102 should be elected as the new coordinator, e.g., as described below.

In some demonstrative embodiments, controller 124 may determine whether or not to take over the election procedure, for example, based on the comparison between the MAC address of device 102 and the MAC address of device 140.

In some demonstrative embodiments, based on the comparison between the MAC address of device 102 and the MAC address of device 140, controller 124 may cause radio 114 to transmit a response frame to device 140, for example, to indicate that device 102 is taking over the election procedure, instead of device 140.

In some demonstrative embodiments, controller 124 may control radio 114 to transmit the response frame, e.g., if the MAC address of wireless device 102 is higher than the MAC address of wireless device 140.

In some demonstrative embodiments, controller 124 may control radio 114 not to transmit the response frame, e.g., if the MAC address of wireless device 102 is lower than the MAC address of wireless device 140.

In some demonstrative embodiments, controller 124 may cause radio 114 to transmit a second election frame including a MAC address of device 102, for example, based on the comparison between the MAC address of device 140 and a MAC address of wireless device 102.

In some demonstrative embodiments, controller 124 may cause radio 114 to transmit the second election frame, for example, after the first election frame, e.g., if controller 124 determines that device 102 should be elected as the new coordinator.

In some demonstrative embodiments, the second election frame may indicate wireless device 102 is to be elected as the coordinator of the multicast group.

In some demonstrative embodiments, device 102 may control and/or may be responsible of the election procedure, e.g., instead of device 140, for example, when controller 124 determines that device 102 is to be elected as the new coordinator.

In some demonstrative embodiments, controller 124 may control radio 114 to transmit the second election frame, e.g., if the MAC address of wireless device 102 is higher than the MAC address of wireless device 140.

In some demonstrative embodiments, controller 124 may control radio 114 not to transmit the second election frame, e.g., if the MAC address of wireless device 102 is lower than the MAC address of wireless device 140.

In one example, the MAC address of device 102 may be higher than the MAC address of wireless device 140. According to this example, device 102 may determine that device 102 should be elected as the new coordinator, and may transmit the second election frame.

In another example, the MAC address of device 102 may be lower than the MAC address of wireless device 140. According to this example, device 102 may determine that device 102 should not be elected as the new coordinator, and may not transmit the second election frame. According to this example, device 140 may not receive a response, e.g., the second election frame from device 102, within the predefined time period, and may become the coordinator, for example, if no response is received from both devices 115 and 102.

In some demonstrative embodiments, device 140 may receive the second election frame from device 102. Accordingly, device 140 may not become the coordinator, and may stop sending additional election frames.

In some demonstrative embodiments, controller 124 may be configured to cause wireless device 102 to become a coordinator of the multicast group, for example, if no response to the second election frame is received within a predefined time period. For example, device 102 may become the coordinator of the group if no response to the second election frame is received from device 115 and/or any other device of the group.

In some demonstrative embodiments, the first and/or second election frames may be communicated as a public action frame.

In some demonstrative embodiments, the response frame may be communicated as a public action frame.

In some demonstrative embodiments, the first and/or second election frames may include a service discovery frame or a dedicated action frame.

In some demonstrative embodiments, the response frame may include a service discovery frame or a dedicated action frame.

In one example, the first election frame, the second election frame, and/or the response frame may be in the form of a NAN Service Discovery frame, e.g., including an ELECTION indication, for example, in a service specific information field, and/or having a Service Control field in the Service Descriptor attribute set to "Publish".

In another example, the first election frame, the second election frame, and/or the response frame may be a dedicated, e.g., new, public action frame, for example, a NAN2 Public Action frame, e.g., as follows:

TABLE 1

| Field | Size (Octets) | Value (Hex) | Description |
|---|---|---|---|
| Category | 1 | 0x04 | IEEE 802.11 Public Action Frame |
| Action Field | 1 | 0x09 | IEEE 802.11 Public Action Frame Vendor Specific |
| OUI | 3 | 0x50-6F-9A | WFA specific OUI |
| OUI Type | 1 | TBD | Identifying the type and version of the NAN2 |
| OUI Subtype | 1 | | Identifying the type of NAN2 Public action frame. The specific value is defined in Table 2. |
| NAN Attributes | Variable | Variable | One or more NAN Attributes |

In some demonstrative embodiments, the type of the NAN2 Public Action frame may be, for example, as follows:

TABLE 2

| Type | Notes |
|---|---|
| 0 | Election Request frame (aka. Election frame) |
| 1 | Election Response frame (aka. OK frame) |
| 2 | Multicast Schedule frame |
| 3-255 | Reserved |

In one example, a NAN2 Public Action frame may include the Type 0 in the OUI Subtype field, for example, if the NAN2 Public Action frame is an election frame, e.g., the first and/or the second action frames.

In another example, the NAN2 Public Action frame may include the Type 1 in the OUI Subtype field, for example, if the NAN2 Public Action frame is a response frame.

In another example, the NAN2 Public Action frame may include the Type 2 in the OUI Subtype field, for example, if the NAN2 Public Action frame is a multicast schedule message.

Figure 2:
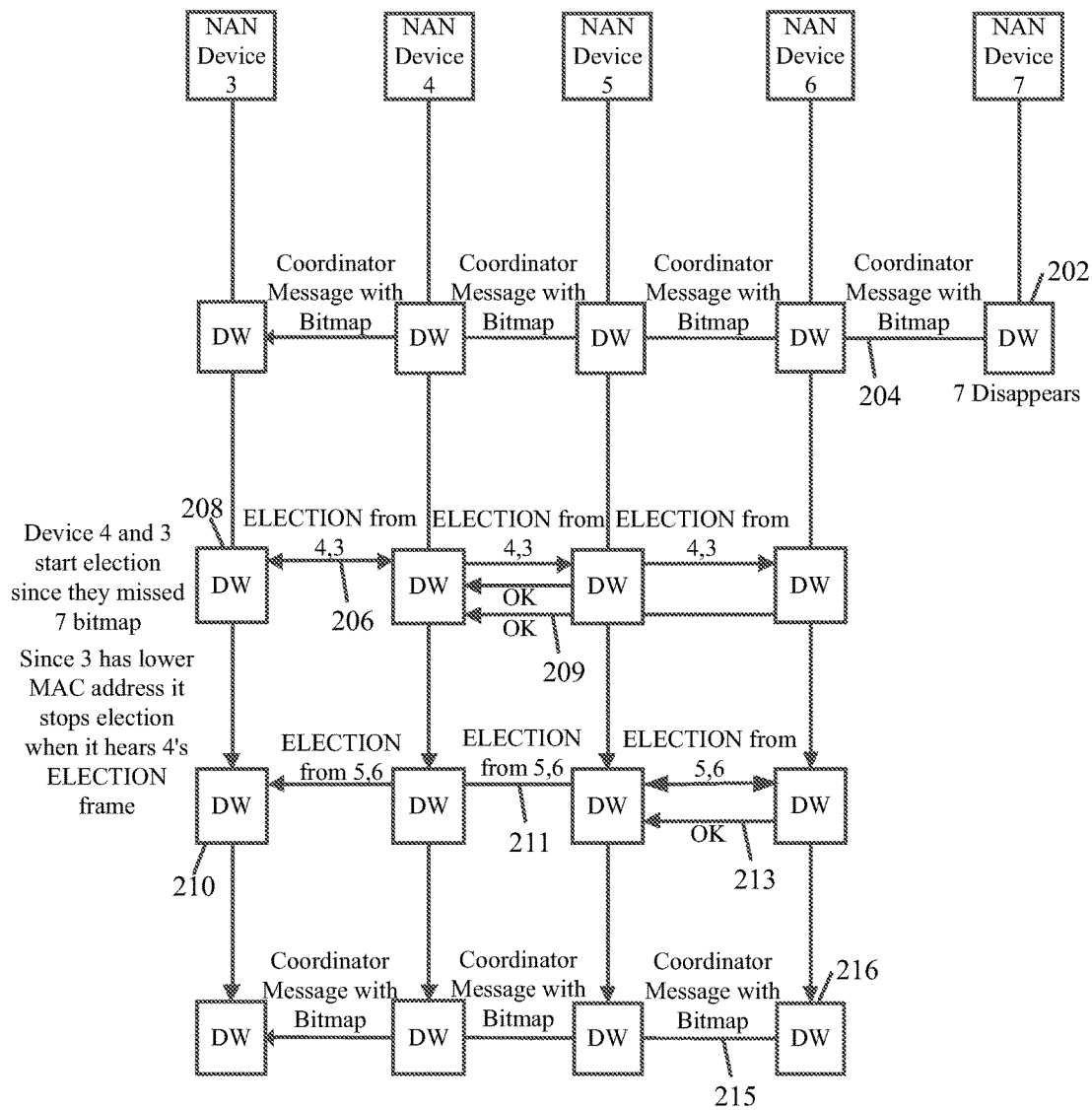
FIG. 2 is a sequence diagram of operations between a plurality of wireless communication devices, in accordance with some demonstrative embodiments.

FIG. 2 is a sequence diagram of operations between a plurality of wireless communication devices, denoted "NAN Device 3", "NAN Device 4", "NAN device 5", "NAN device 6", and "NAN Device 7", in accordance with some demonstrative embodiments. In one example, device 102 (FIG. 1) may perform the functionality of one of NAN Device 3, NAN Device 4, NAN Device 5, NAN Device 6, and NAN Device 7; device 115 (FIG. 1) may perform the functionality of another one of NAN Device 3, NAN Device 4, NAN Device 5, NAN Device 6, and NAN Device 7; device 170 (FIG. 1) may perform the functionality of another one of NAN Device 3, NAN Device 4, NAN Device 5, NAN Device 6, and NAN Device 7; and/or device 140 (FIG. 1) may perform the functionality of another one of NAN Device 3, NAN Device 4, NAN Device 5, NAN Device 6, and NAN Device 7.

In some demonstrative embodiments, the NAN Device 7 may perform the functionality of a coordinator of a group including NAN Device 3, NAN Device 4, NAN Device 5, NAN Device 6, and NAN Device 7. For example, device 170 (FIG. 1) may perform the functionality of the NAN Device 7, e.g., as described above.

In some demonstrative embodiments, the NAN Device 7 may send a message 204, for example, a multicast schedule message, e.g., in the form of a publish frame or any other frame or message, during each DW 202. The message 204 may include the multicast availability information to be used by the group, e.g., in the form of a multicast availability bitmap. For example, device 170 (FIG. 1) may transmit message 204 including the multicast availability information to be used by the multicast group, e.g., as described above.

In some demonstrative embodiments, NAN Device 3, NAN Device 4, NAN Device 5, NAN Device 6, and NAN Device 7 may be available to communicate multicast traffic during one or more time slots and/or over one or more channels indicated by the multicast availability information.

As shown in FIG. 2, in some demonstrative embodiments one or more of NAN Device 3, NAN Device 4, NAN Device 5, and NAN Device 6 may detect that NAN Device 7 has disappeared, for example, after not receiving the message 204 for a predefined number of DWs 202. For example, as shown in FIG. 2, NAN Device 3 and NAN Device 4 may detect that NAN Device 7 has disappeared. For example, device 140 (FIG. 1) may detect that device 170 (FIG. 1) is unavailable, for example, if device 140 (FIG. 1) does not receive message 204 for the predefined number of DWs, e.g., as described above.

In some demonstrative embodiments, NAN Device 3, NAN Device 4, NAN Device 5, and/or NAN Device 6 may perform one or more operations to choose another coordinator, e.g., instead of NAN Device 7, for example, according to an election algorithm, e.g., as described below. For example, device 140 may initiate the election procedure to elect a new coordinator, for example, instead of device 170 (FIG. 1), e.g., as descried below.

In some demonstrative embodiments, a NAN device, which has detected that the NAN Device 7 has disappeared, may send a NAN Election message.

In some demonstrative embodiments, the NAN device may send the Election frame, for example, to all the devices in the group, for example, based on the list of devices in the group, e.g., by using an address set filter, or any other mechanism, e.g., as described above.

In some demonstrative embodiments, NAN Device 3 and/or NAN Device 4 may query the database from the application server for the list of devices in the group, e.g., as described above, for example, to identify and choose the MAC addresses to include in the publish frame address set filter.

As shown in FIG. 2, in one example, NAN Devices 3 and 4 may send Election frames 206 during a DW 208. For example, device 140 (FIG. 1) may transmit an election frame 206 to indicate that device 140 (FIG. 1) is to be elected, for example, instead of device 170 (FIG. 1), e.g., as described above.

In some demonstrative embodiments, a device that receives the ELECTION frame may send an OK response action frame (also refereed to as "Election Response frame" or "Response frame") to the device that sent the ELECTION frame, for example, if the MAC address of the device receiving the Election frame is higher than the MAC address of the sender of the ELECTION frame. The OK response action frame may indicate that the sender of OK response action frame has received the Election frame and is taking over the election process. For example, device 102 (FIG. 1) may send to device 140 (FIG. 1) a response action frame 209 to indicate that device 102 (FIG. 1) is taking over the election procedure, e.g., instead of device 140 (FIG. 1).

In some demonstrative embodiments, a device that receives the ELECTION frame may be configured to select not to send an Election frame and/or an OK response frame, for example, if the MAC address of the device receiving the Election frame is lower than the MAC address of the sender of the ELECTION frame.

As shown in FIG. 2, the NAN Device 3 may receive the Election frame from NAN Device 4, and may select to stop transmission of the Election frame, e.g., if the MAC address of NAN Device 3 is lower than the MAC address of NAN Device 4.

As shown in FIG. 2, the NAN Device 5 and the NAN Device 6 may respond to Election frames 206 with OK response action frames 209. For example, device 102 (FIG. 1) may respond to Election frames 206 from device 140 (FIG. 1) with OK response action frames 209, e.g., as described above.

In some demonstrative embodiments, the device that sent the Election action frame may stop sending the ELECTION frame, for example, upon receiving at least one OK response action frame. For example, device 140 (FIG. 1) may stop to send election frame 206, for example, after receipt of a response action frame 209 from device 102 (FIG. 1), e.g., as described above.

In some demonstrative embodiments, one or more devices that receive the ELECTION frame and their MAC address is higher than the MAC address of the sender of the Election frame may repeat sending the Election frame.

In some demonstrative embodiments, when a device does not receive any response to its ELECTION frame, the device may assume itself as the coordinator ("the new coordinator"). For example, device 140 may assume itself as the coordinator, for example, if device 140 (FIG. 1) does not receive any response to Election frame 206 from devices 102 and/or 115 (FIG. 1), e.g., as described above.

As shown in FIG. 2, NAN Device 5 and NAN Device 6 may take over the election process, and NAN Device 5 and NAN Device 6 may send Election messages 211 during a DW 210.

As shown in FIG. 2, the NAN Device 5 may receive the Election frame from NAN Device 6, and may select to stop transmission of the Election frame, e.g., if the MAC address of NAN Device 5 is lower than the MAC address of NAN Device 6. The NAN Device 6 may respond with OK response action frame 213. For example, device 102 (FIG. 1) may take over the election procedure, and may send OK response action frame 213 to device 140 (FIG. 1), e.g., as described above.

In some demonstrative embodiments, the new coordinator may send a Multicast Schedule frame to all the devices in the group, which contains the multicast availability information, e.g., the availability bitmap, for the multicast data exchange, on each discovery window. The other devices in the group may now know that this device is the coordinator.

As shown in FIG. 2, NAN Device 6 may take over the functionality of the coordinator, and may transmit a message 215, for example, a multicast schedule frame, e.g., in the form of a publish frame or any other frame or message, during each DW 216. The message 215 may include the multicast availability information to be used by the group, e.g., in the form of a multicast availability bitmap. For example, device 102 (FIG. 1) may transmit message 215 including the multicast availability information to the devices of the multicast group, e.g., as described above.

In some demonstrative embodiments, the Multicast Schedule frame may be a publish action frame.

In some demonstrative embodiments, the Multicast Schedule frame may be a dedicated, e.g., new, public action frame, for example, a Public Action frame, e.g., as described above with reference to Tables 1 and/or 2.

In some demonstrative embodiments, all the devices in the group may then become available in the channel and/or time according to the bitmap advertised by the new coordinator.

In some demonstrative embodiments, when the coordinator disappears, multiple devices might start the election algorithm, e.g., together, for example, as described above with respect to NAN Device 3 and NAN Device 4. However, the election algorithm may converge, for example, since the OK action frames may be sent, e.g., always, from the devices having the higher MAC addresses.

In some demonstrative embodiments, the Election frame, the OK frame, and/or the Multicast Schedule frame may be communicated in the form of a NAN Service Discovery frame, for example, with the Service Control field in the Service Descriptor attribute set to "Publish", e.g., as described above.

In some demonstrative embodiments, the Election frame, the OK frame, and/or the Multicast Schedule frame may be communicated in the form of a dedicated, e.g., new Public Action frame, e.g., as described above with reference to Table 1 and/or Table 2.

Figure 3:
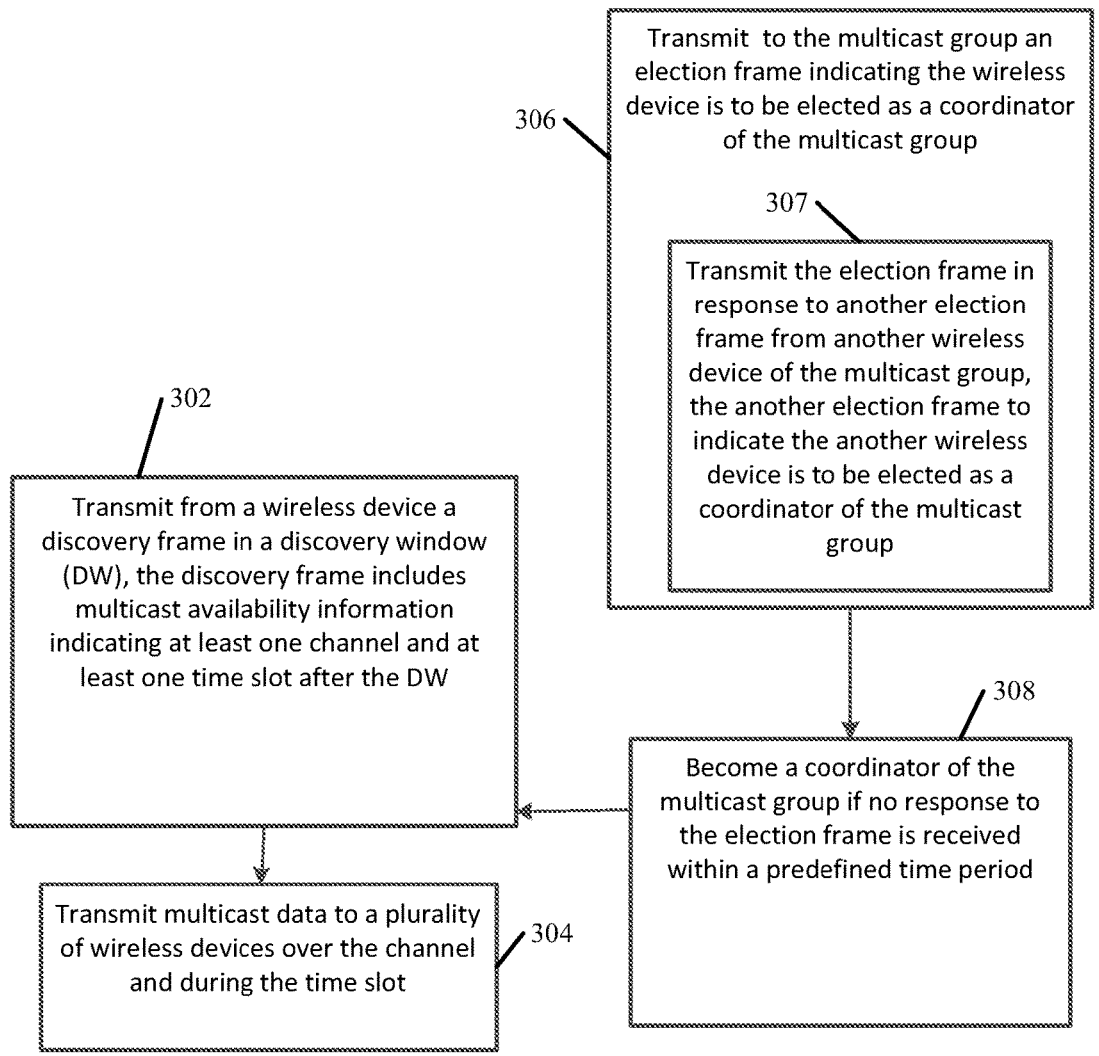
FIG. 3 is a schematic flow-chart illustration of a method of communicating traffic to a plurality of wireless devices, in accordance with some demonstrative embodiments.

Reference is made to FIG. 3, which schematically illustrates a method of communicating traffic to a plurality of wireless devices, in accordance with some demonstrative embodiments. For example, one or more of the operations of the method of FIG. 3 may be performed by a wireless communication system, e.g., system 100 (FIG. 1); a wireless device, wireless devices 102, 140, 170 and/or 115 (FIG. 1); a radio, e.g., radios 114 and/or 154 (FIG. 1); a controller, controllers 124 and/or 154 (FIG. 1); and/or a message processor, e.g., message processors 128 and/or 158 (FIG. 1).

As indicated at block 302, the method may include transmitting from a wireless device a discovery frame in a DW, the discovery frame including multicast availability information indicating at least one channel and at least one time slot after the DW. For example, radio 114 (FIG. 1) may transmit the discovery frame including the multicast availability information, e.g., as described above.

As indicated at block 304, the method may include transmitting multicast data to a plurality of wireless devices over the channel and during the time slot. For example, radio 114 (FIG. 1) may transmit multicast data over the channel and during the time slot, e.g., as described above.

In some demonstrative embodiments, the discovery frame including the multicast availability information may be transmitted by a coordinator of a multicast group including the plurality of wireless devices.

In some demonstrative embodiments, the method may include electing the coordinator of the multicast group.

As indicated at block 306, the method may include transmitting to the multicast group an election frame indicating the wireless device is to be elected as a coordinator of the multicast group. For example, radio 114 (FIG. 1) may transmit the election frame to indicate that device 102 (FIG. 1) is to elected as the coordinator of the multicast group, e.g., as described above.

As indicated at block 307, transmitting the election frame may include transmitting the election frame in response to another election frame from another wireless device of the multicast group, the another election frame to indicate the another election frame is to be elected as a coordinator of the multicast group. For example, radio 114 (FIG. 1) may transmit the election frame to indicate that device 102 (FIG. 1) is to be elected as the coordinator of the multicast group, for example, in response to an election frame from device 140 (FIG. 1) indicating that device 140 is to be elected as the coordinator of the group, e.g., as described above.

As indicated at block 308, the method may include becoming a coordinator of the multicast group if no response to the election frame is received within a predefined time period. For example, radio 114 (FIG. 1) may become the coordinator of the multicast group, for example, if no response to the second election frame is received within the predefined time period, e.g., as described above.

Figure 4:
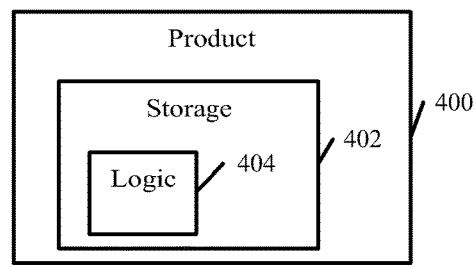
FIG. 4 is a schematic illustration of a product, in accordance with some demonstrative embodiments.

Reference is made to FIG. 4, which schematically illustrates a product of manufacture 400, in accordance with some demonstrative embodiments. Product 400 may include a non-transitory machine-readable storage medium 402 to store logic 404, which may be used, for example, to perform at least part of the functionality of devices 102 (FIG. 1), device 115, 170 and/or 140 (FIG. 1), radios 114 and/or 144 (FIG. 1), transmitters 118 and/or 148 (FIG. 1), receivers 116 and/or 146 (FIG. 1), controllers 124 and/or 154 (FIG. 1), message processors 128 (FIG. 1) and/or 158 (FIG. 1), and/or to perform one or more operations described above with reference to FIGS. 2 and/or 3. The phrase "non-transitory machine-readable medium" is directed to include all computer-readable media, with the sole exception being a transitory propagating signal.

In some demonstrative embodiments, product 400 and/or machine-readable storage medium 402 may include one or more types of computer-readable storage media capable of storing data, including volatile memory, non-volatile memory, removable or non-removable memory, erasable or non-erasable memory, writeable or re-writeable memory, and the like. For example, machine-readable storage medium 402 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 404 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 404 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes an apparatus comprising logic and circuitry configured to cause a wireless device to transmit a discovery frame in a Discovery Window (DW), the discovery frame including multicast availability information indicating at least one channel and at least one time slot after the DW; and transmit multicast data to a plurality of wireless devices over the at least one channel and during the at least one time slot.

Example 2 includes the subject matter of Example 1 being configured to cause the wireless device to transmit the discovery frame during each of a sequence of DWs.

Example 3 includes the subject matter of Example 1 or 2 being configured to cause the wireless device to become a coordinator of a multicast group including the plurality of wireless devices.

Example 4 includes the subject matter of Example 3 being configured to cause the wireless device to select if to become the coordinator of the multicast group to replace an active coordinator.

Example 5 includes the subject matter of any one of Examples 1-4, and optionally, wherein the wireless device comprises an awareness networking device.

Example 6 includes the subject matter of any one of Examples 1-5, and optionally, wherein the wireless device comprises a Neighbor Awareness Networking (NAN) device.

Example 7 includes the subject matter of any one of Examples 1-6, and optionally, comprising a transmitter to transmit the discovery frame and the multicast data.

Example 8 includes the subject matter of any one of Examples 1-7, and optionally, comprising one or more antennas, a memory, and a processor.

Example 9 includes an apparatus comprising logic and circuitry configured to cause a wireless device to receive a first election frame in a Discovery Window (DW), the first election frame to indicate a sender of the election frame is to be elected as a coordinator of a multicast group including the wireless device, the first election frame including a Media Access Control (MAC) address of the sender; and based on a comparison between the MAC address of the sender and a MAC address of the wireless device, transmit a second election frame including a MAC address of the wireless device.

Example 10 includes the subject matter of Example 9, and optionally, wherein the second election frame is to indicate the wireless device is to be elected as a coordinator of the multicast group.

Example 11 includes the subject matter of Example 9 or 10 being configured to cause the wireless device to transmit the second election frame, if the MAC address of the wireless device is higher than the MAC address of the sender, and to cause the wireless device not to transmit the second election frame, if the MAC address of the wireless device is lower than the MAC address of the sender.

Example 12 includes the subject matter of any one of Examples 9-11 being configured to cause the wireless device to become a coordinator of the multicast group, if no response to the second election frame is received within a predefined time period.

Example 13 includes the subject matter of any one of Examples 9-12, and optionally, wherein the first and second election frames are to be communicated as part of an election procedure to elect the coordinator of the multicast group to replace an active coordinator of the multicast group.

Example 14 includes the subject matter of any one of Examples 9-13 being configured to cause the wireless device to transmit a response frame based on the comparison.

Example 15 includes the subject matter of Example 14 being configured to cause the wireless device to transmit the response frame, if the MAC address of the wireless device is higher than the MAC address of the sender, and to cause the wireless device not to transmit the response frame, if the MAC address of the wireless device is lower than the MAC address of the sender.

Example 16 includes the subject matter of any one of Examples 9-15, and optionally, wherein the first and second election frames include a service discovery frame or a dedicated action frame.

Example 17 includes the subject matter of any one of Examples 9-16, and optionally, wherein the first wireless device comprises an awareness networking device.

Example 18 includes the subject matter of any one of Examples 9-17, and optionally, wherein the first wireless device comprises a Neighbor Awareness Networking (NAN) device.

Example 19 includes the subject matter of any one of Examples 9-18, and optionally, comprising a receiver to receive the first election frame; and a transmitter to transmit the second election frame.

Example 20 includes the subject matter of any one of Examples 9-19, and optionally, comprising one or more antennas, a memory, and a processor.

Example 21 includes an apparatus comprising logic and circuitry configured to cause a wireless device to transmit an election frame in a Discovery Window (DW) to a multicast group including the wireless device, the election frame to indicate the wireless device is to be elected as a coordinator of the multicast group, the election frame including a Media Access Control (MAC) address of the wireless device; and become a coordinator of the multicast group if no response to the election frame is received within a predefined time period.

Example 22 includes the subject matter of Example 21 being configured to cause the wireless device to transmit a discovery frame, the discovery frame including multicast availability information indicating at least one channel and at least one time slot.

Example 23 includes the subject matter of Example 22 being configured to cause the wireless device to transmit multicast data to a plurality of wireless devices over the at least one channel and during the at least one time slot.

Example 24 includes the subject matter of any one of Examples 21-23, and optionally, wherein the election frame includes a service discovery frame or a dedicated action frame.

Example 25 includes the subject matter of any one of Examples 21-24, and optionally, wherein the wireless device comprises an awareness networking device.

Example 26 includes the subject matter of any one of Examples 21-25, and optionally, wherein the wireless device comprises a Neighbor Awareness Networking (NAN) device.

Example 27 includes the subject matter of any one of Examples 21-26, and optionally, comprising a transmitter to transmit the election frame.

Example 28 includes the subject matter of any one of Examples 21-27, and optionally, comprising one or more antennas, a memory, and a processor.

Example 29 includes a system comprising a wireless device, the wireless device comprising one or more antennas; a memory; a processor; and a radio to transmit a discovery frame in a Discovery Window (DW), the discovery frame including multicast availability information indicating at least one channel and at least one time slot; and to transmit multicast data to a plurality of wireless devices over the at least one channel and during the at least one time slot.

Example 30 includes the subject matter of Example 29, and optionally, wherein the radio is to transmit the discovery frame during each of a sequence of DWs.

Example 31 includes the subject matter of Example 29 or 30, and optionally, wherein the wireless device is to become a coordinator of a multicast group including the plurality of wireless devices.

Example 32 includes the subject matter of Example 31, and optionally, wherein the wireless device is to select if to become the coordinator of the multicast group to replace an active coordinator.

Example 33 includes the subject matter of any one of Examples 29-32, and optionally, wherein the wireless device comprises an awareness networking device.

Example 34 includes the subject matter of any one of Examples 29-33, and optionally, wherein the wireless device comprises a Neighbor Awareness Networking (NAN) device.

Example 35 includes a system comprising a wireless device, the wireless device comprising one or more antennas; a memory; a processor; and a radio to receive a first election frame in a Discovery Window (DW), the first election frame to indicate a sender of the election frame is to be elected as a coordinator of a multicast group including the wireless device, the first election frame including a Media Access Control (MAC) address of the sender; and, based on a comparison between the MAC address of the sender and a MAC address of the wireless device, to transmit a second election frame including a MAC address of the wireless device.

Example 36 includes the subject matter of Example 35, and optionally, wherein the second election frame is to indicate the wireless device is to be elected as a coordinator of the multicast group.

Example 37 includes the subject matter of Example 35 or 36, and optionally, wherein the radio is to transmit the second election frame, if the MAC address of the wireless device is higher than the MAC address of the sender, and not to transmit the second election frame, if the MAC address of the wireless device is lower than the MAC address of the sender.

Example 38 includes the subject matter of any one of Examples 35-37, and optionally, wherein the wireless device is to become a coordinator of the multicast group, if no response to the second election frame is received within a predefined time period.

Example 39 includes the subject matter of any one of Examples 35-38, and optionally, wherein the first and second election frames are to be communicated as part of an election procedure to elect the coordinator of the multicast group to replace an active coordinator of the multicast group.

Example 40 includes the subject matter of any one of Examples 35-39, and optionally, wherein the radio is to transmit a response frame based on the comparison.

Example 41 includes the subject matter of Example 40, and optionally, wherein the radio is to transmit the response frame, if the MAC address of the wireless device is higher than the MAC address of the sender, and not to transmit the response frame, if the MAC address of the wireless device is lower than the MAC address of the sender.

Example 42 includes the subject matter of any one of Examples 35-41, and optionally, wherein the first and second election frames include a service discovery frame or a dedicated action frame.

Example 43 includes the subject matter of any one of Examples 35-42, and optionally, wherein the wireless device comprises an awareness networking device.

Example 44 includes the subject matter of any one of Examples 35-43, and optionally, wherein the wireless device comprises a Neighbor Awareness Networking (NAN) device.

Example 45 includes a system comprising a wireless device, the wireless device comprising one or more antennas; a memory; a processor; and a radio transmit an election frame in a Discovery Window (DW) to a multicast group including the wireless device, the election frame to indicate the wireless device is to be elected as a coordinator of the multicast group, the election frame including a Media Access Control (MAC) address of the wireless device, the wireless device is to become a coordinator of the multicast group if no response to the election frame is received within a predefined time period.

Example 46 includes the subject matter of Example 45, and optionally, wherein the radio is to transmit a discovery frame, the discovery frame including multicast availability information indicating at least one channel and at least one time slot.

Example 47 includes the subject matter of Example 46, and optionally, wherein the radio is to transmit multicast data to a plurality of wireless devices over the at least one channel and during the at least one time slot.

Example 48 includes the subject matter of any one of Examples 45-47, and optionally, wherein the election frame includes a service discovery frame or a dedicated action frame.

Example 49 includes the subject matter of any one of Examples 45-48, and optionally, wherein the wireless device comprises an awareness networking device.

Example 50 includes the subject matter of any one of Examples 45-49, and optionally, wherein the wireless device comprises a Neighbor Awareness Networking (NAN) device.

Example 51 includes a method to be performed at a wireless device, the method comprising transmitting a discovery frame in a Discovery Window (DW), the discovery frame including multicast availability information indicating at least one channel and at least one time slot; and transmitting multicast data to a plurality of wireless devices over the at least one channel and during the at least one time slot.

Example 52 includes the subject matter of Example 51, and optionally, comprising transmitting the discovery frame during each of a sequence of DWs.

Example 53 includes the subject matter of Example 51 or 52, and optionally, comprising becoming a coordinator of a multicast group including the plurality of wireless devices.

Example 54 includes the subject matter of Example 53, and optionally, comprising becoming the coordinator of the multicast group to replace an active coordinator.

Example 55 includes the subject matter of any one of Examples 51-54, and optionally, wherein the wireless device comprises an awareness networking device.

Example 56 includes the subject matter of any one of Examples 51-55, and optionally, wherein the wireless device comprises a Neighbor Awareness Networking (NAN) device.

Example 57 includes a method to be performed at a wireless device, the method comprising receiving a first election frame in a Discovery Window (DW), the first election frame to indicate a sender of the election frame is to be elected as a coordinator of a multicast group including the wireless device, the first election frame including a Media Access Control (MAC) address of the sender; and based on a comparison between the MAC address of the sender and a MAC address of the wireless device, transmitting a second election frame including a MAC address of the wireless device.

Example 58 includes the subject matter of Example 57, and optionally, wherein the second election frame is to indicate the wireless device is to be elected as a coordinator of the multicast group.

Example 59 includes the subject matter of Example 57 or 58, and optionally, comprising transmitting the second election frame, if the MAC address of the wireless device is higher than the MAC address of the sender, and selecting not to transmit the second election frame, if the MAC address of the wireless device is lower than the MAC address of the sender.

Example 60 includes the subject matter of any one of Examples 57-59, and optionally, comprising becoming a coordinator of the multicast group, if no response to the second election frame is received within a predefined time period.

Example 61 includes the subject matter of any one of Examples 57-60, and optionally, wherein the first and second election frames are to be communicated as part of an election procedure to elect the coordinator of the multicast group to replace an active coordinator of the multicast group.

Example 62 includes the subject matter of any one of Examples 57-61, and optionally, comprising transmitting a response frame based on the comparison.

Example 63 includes the subject matter of Example 62, and optionally, comprising transmitting the response frame, if the MAC address of the wireless device is higher than the MAC address of the sender, and selecting not to transmit the response frame, if the MAC address of the wireless device is lower than the MAC address of the sender.

Example 64 includes the subject matter of any one of Examples 57-63, and optionally, wherein the first and second election frames include a service discovery frame or a dedicated action frame.

Example 65 includes the subject matter of any one of Examples 57-64, and optionally, wherein the wireless device comprises an awareness networking device.

Example 66 includes the subject matter of any one of Examples 57-65, and optionally, wherein the wireless device comprises a Neighbor Awareness Networking (NAN) device.

Example 67 includes a method to be performed at a wireless device, the method comprising transmitting an election frame in a Discovery Window (DW) to a multicast group including the wireless device, the election frame to indicate the wireless device is to be elected as a coordinator of the multicast group, the election frame including a Media Access Control (MAC) address of the wireless device; and becoming a coordinator of the multicast group if no response to the election frame is received within a predefined time period.

Example 68 includes the subject matter of Example 67, and optionally, comprising transmitting a discovery frame, the discovery frame including multicast availability information indicating at least one channel and at least one time slot.

Example 69 includes the subject matter of Example 68, and optionally, comprising transmitting multicast data to a plurality of wireless devices over the at least one channel and during the at least one time slot.

Example 70 includes the subject matter of any one of Examples 67-69, and optionally, wherein the election frame includes a service discovery frame or a dedicated action frame.

Example 71 includes the subject matter of any one of Examples 67-70, and optionally, wherein the wireless device comprises an awareness networking device.

Example 72 includes the subject matter of any one of Examples 67-71, and optionally, wherein the wireless device comprises a Neighbor Awareness Networking (NAN) device.

Example 73 includes a product including one or more tangible computer-readable non-transitory storage media comprising computer-executable instructions operable to, when executed by at least one computer processor, enable the at least one computer processor to implement a method at a wireless device, the method comprising transmitting a discovery frame in a Discovery Window (DW), the discovery frame including multicast availability information indicating at least one channel and at least one time slot; and transmitting multicast data to a plurality of wireless devices over the at least one channel and during the at least one time slot.

Example 74 includes the subject matter of Example 73, and optionally, wherein the method comprises transmitting the discovery frame during each of a sequence of DWs.

Example 75 includes the subject matter of Example 73 or 74, and optionally, wherein the method comprises becoming a coordinator of a multicast group including the plurality of wireless devices.

Example 76 includes the subject matter of Example 75, and optionally, wherein the method comprises becoming the coordinator of the multicast group to replace an active coordinator.

Example 77 includes the subject matter of any one of Examples 73-76, and optionally, wherein the wireless device comprises an awareness networking device.

Example 78 includes the subject matter of any one of Examples 73-77, and optionally, wherein the wireless device comprises a Neighbor Awareness Networking (NAN) device.

Example 79 includes a product including one or more tangible computer-readable non-transitory storage media comprising computer-executable instructions operable to, when executed by at least one computer processor, enable the at least one computer processor to implement a method at a wireless device, the method comprising receiving a first election frame in a Discovery Window (DW), the first election frame to indicate a sender of the election frame is to be elected as a coordinator of a multicast group including the wireless device, the first election frame including a Media Access Control (MAC) address of the sender; and based on a comparison between the MAC address of the sender and a MAC address of the wireless device, transmitting a second election frame including a MAC address of the wireless device.

Example 80 includes the subject matter of Example 79, and optionally, wherein the second election frame is to indicate the wireless device is to be elected as a coordinator of the multicast group.

Example 81 includes the subject matter of Example 79 or 80, and optionally, wherein the method comprises transmitting the second election frame, if the MAC address of the wireless device is higher than the MAC address of the sender, and selecting not to transmit the second election frame, if the MAC address of the wireless device is lower than the MAC address of the sender.

Example 82 includes the subject matter of any one of Examples 79-81, and optionally, wherein the method comprises becoming a coordinator of the multicast group, if no response to the second election frame is received within a predefined time period.

Example 83 includes the subject matter of any one of Examples 79-82, and optionally, wherein the first and second election frames are to be communicated as part of an election procedure to elect the coordinator of the multicast group to replace an active coordinator of the multicast group.

Example 84 includes the subject matter of any one of Examples 79-83, and optionally, wherein the method comprises transmitting a response frame based on the comparison.

Example 85 includes the subject matter of Example 84, and optionally, wherein the method comprises transmitting the response frame, if the MAC address of the wireless device is higher than the MAC address of the sender, and selecting not to transmit the response frame, if the MAC address of the wireless device is lower than the MAC address of the sender.

Example 86 includes the subject matter of any one of Examples 79-85, and optionally, wherein the first and second election frames include a service discovery frame or a dedicated action frame.

Example 87 includes the subject matter of any one of Examples 79-86, and optionally, wherein the wireless device comprises an awareness networking device.

Example 88 includes the subject matter of any one of Examples 79-87, and optionally, wherein the wireless device comprises a Neighbor Awareness Networking (NAN) device.

Example 89 includes a product including one or more tangible computer-readable non-transitory storage media comprising computer-executable instructions operable to, when executed by at least one computer processor, enable the at least one computer processor to implement a method at a wireless device, the method comprising transmitting an election frame in a Discovery Window (DW) to a multicast group including the wireless device, the election frame to indicate the wireless device is to be elected as a coordinator of the multicast group, the election frame including a Media Access Control (MAC) address of the wireless device; and becoming a coordinator of the multicast group if no response to the election frame is received within a predefined time period.

Example 90 includes the subject matter of Example 89, and optionally, wherein the method comprises transmitting a discovery frame, the discovery frame including multicast availability information indicating at least one channel and at least one time slot.

Example 91 includes the subject matter of Example 90, and optionally, wherein the method comprises transmitting multicast data to a plurality of wireless devices over the at least one channel and during the at least one time slot.

Example 92 includes the subject matter of any one of Examples 89-91, and optionally, wherein the election frame includes a service discovery frame or a dedicated action frame.

Example 93 includes the subject matter of any one of Examples 89-92, and optionally, wherein the wireless device comprises an awareness networking device.

Example 94 includes the subject matter of any one of Examples 89-93, and optionally, wherein the wireless device comprises a Neighbor Awareness Networking (NAN) device.

Example 95 includes an apparatus of wireless communication, the apparatus comprising means for transmitting a discovery frame in a Discovery Window (DW) from a wireless device, the discovery frame including multicast availability information indicating at least one channel and at least one time slot; and means for transmitting multicast data to a plurality of wireless devices over the at least one channel and during the at least one time slot.

Example 96 includes the subject matter of Example 95, and optionally, comprising means for transmitting the discovery frame during each of a sequence of DWs.

Example 97 includes the subject matter of Example 95 or 96, and optionally, comprising means for becoming a coordinator of a multicast group including the plurality of wireless devices.

Example 98 includes the subject matter of Example 97, and optionally, comprising means for becoming the coordinator of the multicast group to replace an active coordinator.

Example 99 includes the subject matter of any one of Examples 95-98, and optionally, wherein the wireless device comprises an awareness networking device.

Example 100 includes the subject matter of any one of Examples 95-99, and optionally, wherein the wireless device comprises a Neighbor Awareness Networking (NAN) device.

Example 101 includes an apparatus of wireless communication, the apparatus comprising means for receiving a first election frame in a Discovery Window (DW) at a wireless device, the first election frame to indicate a sender of the election frame is to be elected as a coordinator of a multicast group including the wireless device, the first election frame including a Media Access Control (MAC) address of the sender; and means for, based on a comparison between the MAC address of the sender and a MAC address of the wireless device, transmitting a second election frame including a MAC address of the wireless device.

Example 102 includes the subject matter of Example 101, and optionally, wherein the second election frame is to indicate the wireless device is to be elected as a coordinator of the multicast group.

Example 103 includes the subject matter of Example 101 or 102, and optionally, comprising means for transmitting the second election frame, if the MAC address of the wireless device is higher than the MAC address of the sender, and selecting not to transmit the second election frame, if the MAC address of the wireless device is lower than the MAC address of the sender.

Example 104 includes the subject matter of any one of Examples 101-103, and optionally, comprising means for becoming a coordinator of the multicast group, if no response to the second election frame is received within a predefined time period.

Example 105 includes the subject matter of any one of Examples 101-104, and optionally, wherein the first and second election frames are to be communicated as part of an election procedure to elect the coordinator of the multicast group to replace an active coordinator of the multicast group.

Example 106 includes the subject matter of any one of Examples 101-105, and optionally, comprising means for transmitting a response frame based on the comparison.

Example 107 includes the subject matter of Example 106, and optionally, comprising means for transmitting the response frame, if the MAC address of the wireless device is higher than the MAC address of the sender, and selecting not to transmit the response frame, if the MAC address of the wireless device is lower than the MAC address of the sender.

Example 108 includes the subject matter of any one of Examples 101-107, and optionally, wherein the first and second election frames include a service discovery frame or a dedicated action frame.

Example 109 includes the subject matter of any one of Examples 101-108, and optionally, wherein the wireless device comprises an awareness networking device.

Example 110 includes the subject matter of any one of Examples 101-109, and optionally, wherein the wireless device comprises a Neighbor Awareness Networking (NAN) device.

Example 111 includes an apparatus of wireless communication, the apparatus comprising means for transmitting in a Discovery Window (DW) an election frame from a wireless device to a multicast group including the wireless device, the election frame to indicate the wireless device is to be elected as a coordinator of the multicast group, the election frame including a Media Access Control (MAC) address of the wireless device; and means for becoming a coordinator of the multicast group if no response to the election frame is received within a predefined time period.

Example 112 includes the subject matter of Example 111, and optionally, comprising means for transmitting a discovery frame, the discovery frame including multicast availability information indicating at least one channel and at least one time slot.

Example 113 includes the subject matter of Example 112, and optionally, comprising means for transmitting multicast data to a plurality of wireless devices over the at least one channel and during the at least one time slot.

Example 114 includes the subject matter of any one of Examples 111-113, and optionally, wherein the election frame includes a service discovery frame or a dedicated action frame.

Example 115 includes the subject matter of any one of Examples 111-114, and optionally, wherein the wireless device comprises an awareness networking device.

Example 116 includes the subject matter of any one of Examples 111-115, and optionally, wherein the wireless device comprises a Neighbor Awareness Networking (NAN) device.

Functions, operations, components and/or features described herein with reference to one or more embodiments, may be combined with, or may be utilized in combination with, one or more other functions, operations, components and/or features described herein with reference to one or more other embodiments, or vice versa.

While certain features of have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising logic and circuitry configured to cause a wireless device to:
    transmit a discovery frame in a Discovery Window (DW) of a Neighbor Awareness Networking (NAN) cluster, the discovery frame including multicast availability information corresponding to a NAN multicast group comprising a plurality of wireless devices of the NAN cluster, the multicast availability information indicating at least one channel and one or more available time slots after said DW, the multicast availability information comprising a time bitmap comprising a plurality of bits corresponding to a respective plurality of time slots, a bit of the plurality of bits to identify whether a respective time slot of the plurality of time slots is an available time slot or an unavailable time slot; and
    transmit a multicast transmission comprising multicast data to the NAN multicast group over the at least one channel and during at least one of the available time slots.

2. The apparatus of claim 1 configured to cause the wireless device to transmit the discovery frame during each of a sequence of DWs.

3. The apparatus of claim 1 configured to cause the wireless device to act as a coordinator of the NAN multicast group.

4. The apparatus of claim 3 configured to cause the wireless device to select if to become the coordinator of the NAN multicast group to replace an active coordinator.

5. The apparatus of claim 1, wherein said wireless device comprises an awareness networking device.

6. The apparatus of claim 1, wherein said wireless device comprises a Neighbor Awareness Networking (NAN) device.

7. The apparatus of claim 1 comprising a transmitter to transmit said discovery frame and said multicast data.

8. The apparatus of claim 1 comprising one or more antennas, a memory, and a processor.

9. An apparatus comprising logic and circuitry configured to cause a wireless device to:
    receive a first election frame in a Discovery Window (DW) of a Neighbor Awareness Networking (NAN) cluster, said first election frame to indicate a sender of said first election frame is to be elected as a coordinator of a NAN multicast group including said wireless device and one or more other wireless devices of the NAN cluster, the first election frame including a Media Access Control (MAC) address of said sender; and
    based on a comparison between the MAC address of the sender and a MAC address of said wireless device, transmit to the NAN multicast group a second election frame including the MAC address of said wireless device if the MAC address of said wireless device is higher than the MAC address of the sender, and select not to transmit said second election frame if the MAC address of said wireless device is lower than the MAC address of the sender.

10. The apparatus of claim 9, wherein said second election frame is to indicate said wireless device is to be elected as the coordinator of said NAN multicast group.

11. The apparatus of claim 9 configured to cause said wireless device to act as the coordinator of said NAN multicast group, if no response to said second election frame is received within a predefined time period.

12. The apparatus of claim 9, wherein said first and second election frames are to be communicated as part of an election procedure to elect the coordinator of the NAN multicast group to replace an active coordinator of said NAN multicast group.

13. The apparatus of claim 9 configured to cause the wireless device to transmit a response frame to the sender based on said comparison.

14. The apparatus of claim 13 configured to cause the wireless device to transmit the response frame, if the MAC address of said wireless device is higher than the MAC address of the sender, and to cause the wireless device not to transmit said response frame, if the MAC address of said wireless device is lower than the MAC address of the sender.

15. The apparatus of claim 12, wherein said first and second election frames include a service discovery frame or a dedicated action frame.

16. The apparatus of claim 12 comprising one or more antennas, a memory, and a processor.

17. A product including one or more tangible computer-readable non-transitory storage media comprising computer-executable instructions operable to, when executed by at least one processor, enable the at least one processor to cause a wireless device to:

transmit an election frame in a Discovery Window (DW) of a Neighbor Awareness Networking (NAN) cluster to a NAN multicast group including said wireless device and one or more other wireless devices of the NAN cluster, said election frame to indicate said wireless device is to be elected as a coordinator of said NAN multicast group, the election frame including a Media Access Control (MAC) address of said wireless device;

act as the coordinator of said NAN multicast group if no response to said election frame is received within a predefined time period; and transmit a discovery frame comprising multicast availability information corresponding to the NAN multicast group, the multicast availability information indicating at least one channel and at least one time slot.

18. The product of claim 17, wherein said election frame comprises a service discovery frame or a dedicated action frame.

19. The product of claim 17, wherein said instructions, when executed, cause the wireless device to transmit a multicast transmission comprising multicast data to the NAN multicast group over the at least one channel and during the at least one time slot.

20. A product including one or more tangible computer-readable non-transitory storage media comprising computer-executable instructions operable to, when executed by at least one processor, enable the at least one processor to cause a wireless device to:

receive a first election frame in a Discovery Window (DW) of a Neighbor Awareness Networking (NAN) cluster, said first election frame to indicate a sender of said first election frame is to be elected as a coordinator of a NAN multicast group including said wireless device and one or more other wireless devices of the NAN cluster, the first election frame including a Media Access Control (MAC) address of said sender; and based on a comparison between the MAC address of the sender and a MAC address of said wireless device, transmit to the NAN multicast group a second election frame including the MAC address of said wireless device if the MAC address of said wireless device is higher than the MAC address of the sender, and select not to transmit said second election frame if the MAC address of said wireless device is lower than the MAC address of the sender.

21. The product of claim 20, wherein said second election frame is to indicate said wireless device is to be elected as the coordinator of said NAN multicast group.

22. The product of claim 20, wherein said first and second election frames are to be communicated as part of an election procedure to elect the coordinator of the NAN multicast group to replace an active coordinator of said NAN multicast group.

23. The product of claim 20, wherein said instructions, when executed, cause the wireless device to act as the coordinator of said NAN multicast group, if no response to said second election frame is received within a predefined time period.

24. The product of claim 21, wherein said instructions, when executed, cause the wireless device to transmit a response frame to the sender based on said comparison.

\* \* \* \* \*

UNITED STATES PATENT AND TRADEMARK OFFICE
CERTIFICATE OF CORRECTION

PATENT NO. : 9,998,879 B2  
APPLICATION NO. : 14/670513  
DATED : June 12, 2018  
INVENTOR(S) : Elad Oren et al.

Page 1 of 1

It is certified that error appears in the above-identified patent and that said Letters Patent is hereby corrected as shown below:

In the Claims

In Column 34, Line 65, in Claim 15, delete "The apparatus of claim 12," and insert --The apparatus of claim 9,--, therefor.

In Column 35, Line 1, in Claim 16, delete "The apparatus of claim 12" and insert --The apparatus of claim 9--, therefor.

In Column 36, Line 31, in Claim 24, delete "The product of claim 21," and insert --The product of claim 20,--, therefor.

Signed and Sealed this
Twenty-first Day of August, 2018

Andrei Iancu
*Director of the United States Patent and Trademark Office*